(12) United States Patent
Yamamoto et al.

(10) Patent No.: US 11,099,071 B2
(45) Date of Patent: Aug. 24, 2021

(54) IMAGING CONDITION EVALUATION DEVICE AND IMAGING CONDITION EVALUATION METHOD

(71) Applicant: Seiko Epson Corporation, Tokyo (JP)

(72) Inventors: Yuki Yamamoto, Shiojiri (JP); Ryohei Kuri, Matsumoto (JP)

(73) Assignee: Seiko Epson Corporation ( * ) Notice: Subject to any disclaimer, the term of this patent is extended or adjusted under 35 U.S.C. 154(b) by 0 days.

(21) Appl. No.: 16/835,371

(22) Filed: Mar. 31, 2020

(65) Prior Publication Data
US 2020/0309600 A1 Oct. 1, 2020

(30) Foreign Application Priority Data

Apr. 1, 2019 (JP) .............................. JP2019-070079

(51) Int. Cl.
G01J 3/28 (2006.01)
G01J 3/10 (2006.01)
(52) U.S. Cl.
CPC ............... G01J 3/2823 (2013.01); G01J 3/10 (2013.01)

(58) Field of Classification Search
CPC .................................. G01J 3/2823; G01J 3/10
See application file for complete search history.

(56) References Cited

U.S. PATENT DOCUMENTS

2012/0293801 A1* 11/2012 Kanai .................. G01N 21/251
356/402
2013/0127946 A1 5/2013 Kanai
2015/0369664 A1 12/2015 Garsha et al.

FOREIGN PATENT DOCUMENTS

JP 2008-289560 A 12/2008
JP 2013-107269 A 6/2013
JP 2018-119968 A 8/2018

* cited by examiner

Primary Examiner — Jamil Ahmed
(74) Attorney, Agent, or Firm — Harness, Dickey & Pierce, P.L.C.

(57) ABSTRACT

An imaging condition evaluation device according to the present disclosure includes: a spectrometer configured to capture a spectral image under an arbitrarily set imaging condition; and an evaluation unit configured to set a first region and a second region different from each other in the spectral image, and calculate an evaluation value of the imaging condition based on an optical spectrum of the first region and an optical spectrum of the second region.

7 Claims, 5 Drawing Sheets

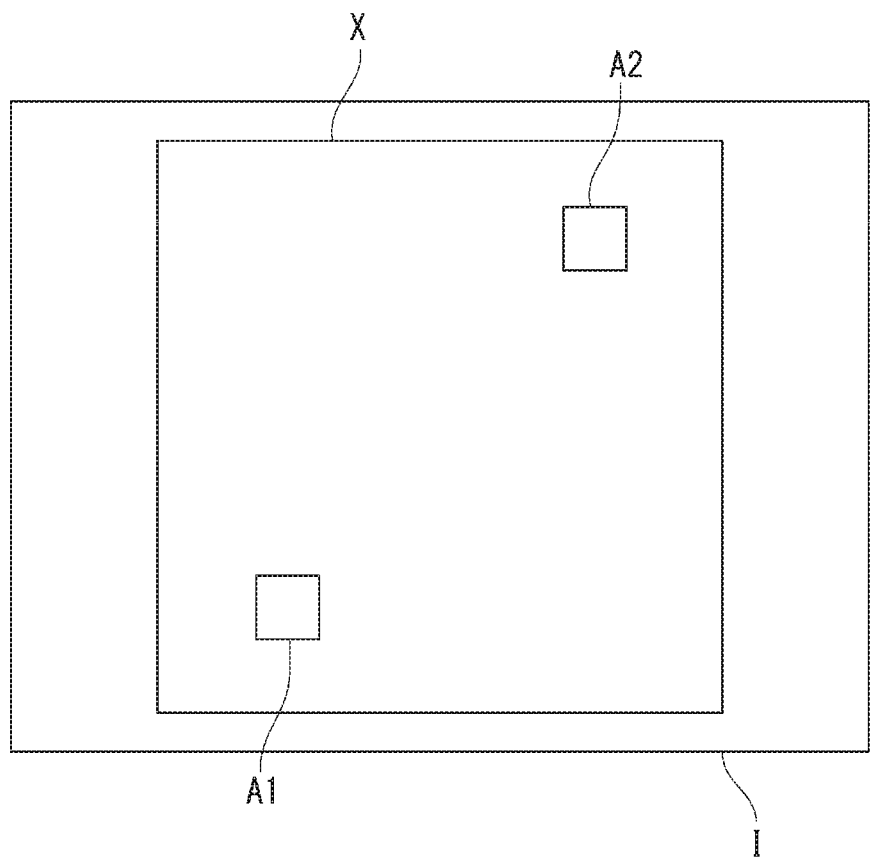

IMAGING CONDITION EVALUATION DEVICE AND IMAGING CONDITION EVALUATION METHOD

The present application is based on, and claims priority from JP Application Serial Number 2019-070079, filed Apr. 1, 2019, the disclosure of which is hereby incorporated by reference herein in its entirety.

BACKGROUND

1. Technical Field

The present disclosure relates to an imaging condition evaluation device and an imaging condition evaluation method.

2. Related Art

In related art, there is an analysis method for estimating a component, a state, and the like of an object based on a spectral image of the object. As a device using such an analysis method, for example, JP-A-2013-107269 discloses a printing device that measures spectrum information of a print medium, and performs multivariate analysis based on the spectrum information, so as to determine a type of the print medium.

In general, spectrum information of an analysis target varies according to imaging conditions such as a type of a light source and a posture of a camera. Therefore, in the related art such as JP-A-2013-107269, it is necessary to acquire spectral images of a known sample under various imaging conditions and perform an analysis similar to a main analysis such as multivariate analysis based on each spectral image, so as to search for an imaging condition that can ensure good analysis accuracy. However, since it is necessary to perform the analysis similar to the main analysis every time the imaging condition is varied, it takes a long time to evaluate the plurality of imaging conditions.

SUMMARY

An imaging condition evaluation device according to the present disclosure includes: a spectrometer configured to capture a spectral image under an arbitrarily set imaging condition; and an evaluation unit configured to set a first region and a second region different from each other in the spectral image, and calculate an evaluation value of the imaging condition based on an optical spectrum of the first region and an optical spectrum of the second region.

In the imaging condition evaluation device according to the present disclosure, the evaluation unit may be configured to calculate a spectrum separation degree representing a degree of a separation between the optical spectrum of the first region and the optical spectrum of the second region as the evaluation value.

In the imaging condition evaluation device according to the present disclosure, the evaluation unit may be configured to set the first region in a first object in the spectral image, and set the second region in a second object in the spectral image, the second object being different from the first object.

In the imaging condition evaluation device according to the present disclosure, the evaluation unit may be configured to set the first region and the second region in the same object in the spectral image.

In the imaging condition evaluation device according to the present disclosure, the spectrometer may include an illumination unit configured to emit illumination light, and an illumination direction changing mechanism configured to vary a posture of the illumination unit, and the imaging condition is adjusted by the illumination direction changing mechanism changing the posture of the illumination unit.

In the imaging condition evaluation device according to the present disclosure, the spectrometer may include an imaging unit configured to capture the spectral image, and a changing mechanism configured to vary a posture of the imaging unit, and the imaging condition may be adjusted by the posture of the imaging unit.

The imaging condition evaluation method according to the present disclosure includes: a spectral image capturing step of capturing a spectral image under an arbitrarily set imaging condition; a region setting step of setting a first region and a second region different from each other in the spectral image; and an evaluation step of calculating an evaluation value of the imaging condition based on an optical spectrum of the first region and an optical spectrum of the second region.

BRIEF DESCRIPTION OF THE DRAWINGS

FIG. 5 is a schematic diagram showing an example of a spectral image in a modification.

DESCRIPTION OF EXEMPLARY EMBODIMENTS

An embodiment of the present disclosure will be described below.

Figure 1:
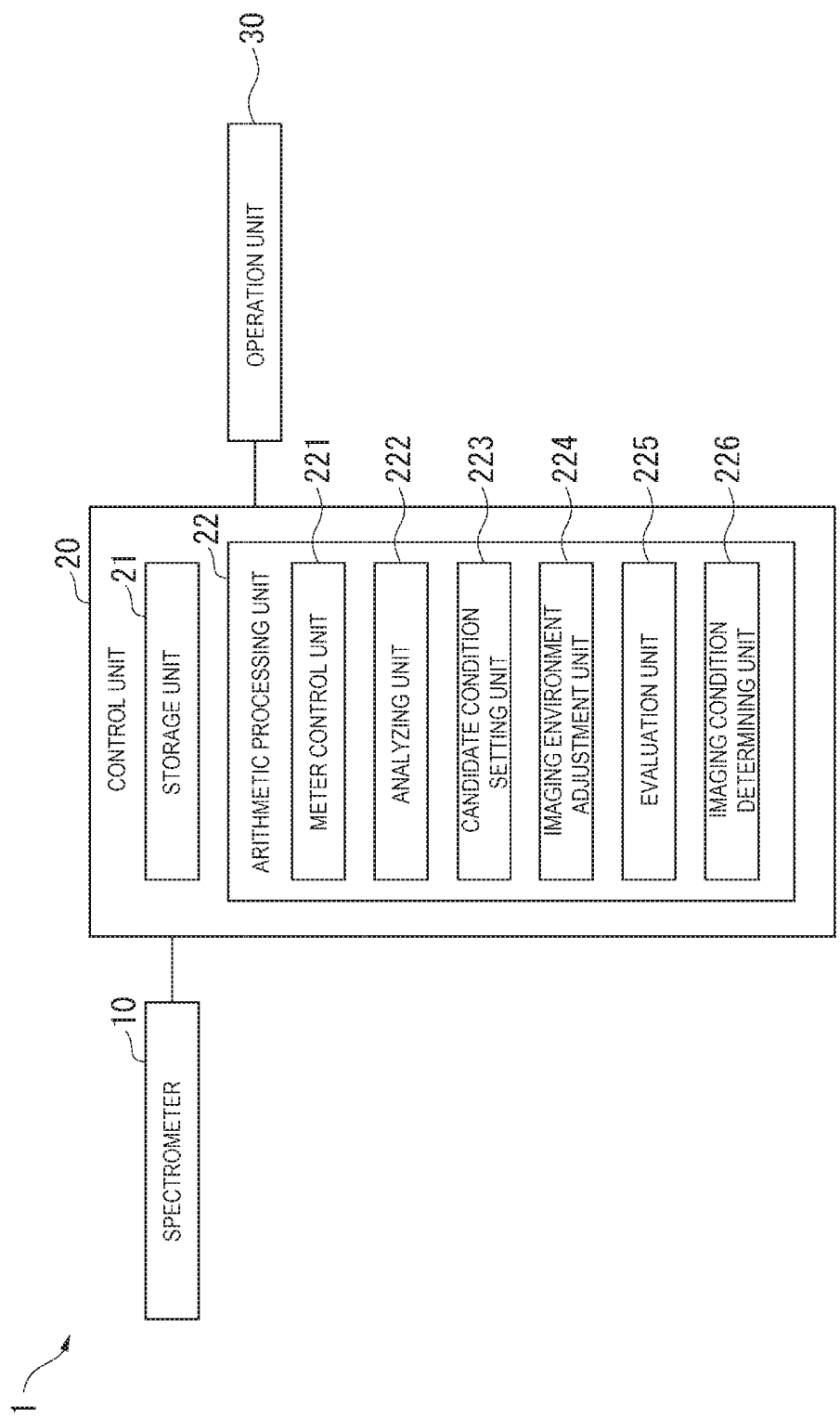
FIG. 1 is a block diagram showing a schematic configuration of an analysis device according to an embodiment of the present disclosure.

FIG. 1 is a block diagram showing a schematic configuration of an analysis device 1 of the present embodiment. As shown in FIG. 1, the analysis device 1 of the present embodiment includes a spectrometer 10 and a control unit 20 that controls the spectrometer 10. The analysis device 1 is a device that determines a type and a state of an analysis target based on a spectral image I of the analysis target. In addition, the analysis device 1 has a function of evaluating an imaging condition for capturing the spectral image I as an imaging condition evaluation device of the present disclosure.

Configuration of Spectrometer 10

Figure 2:
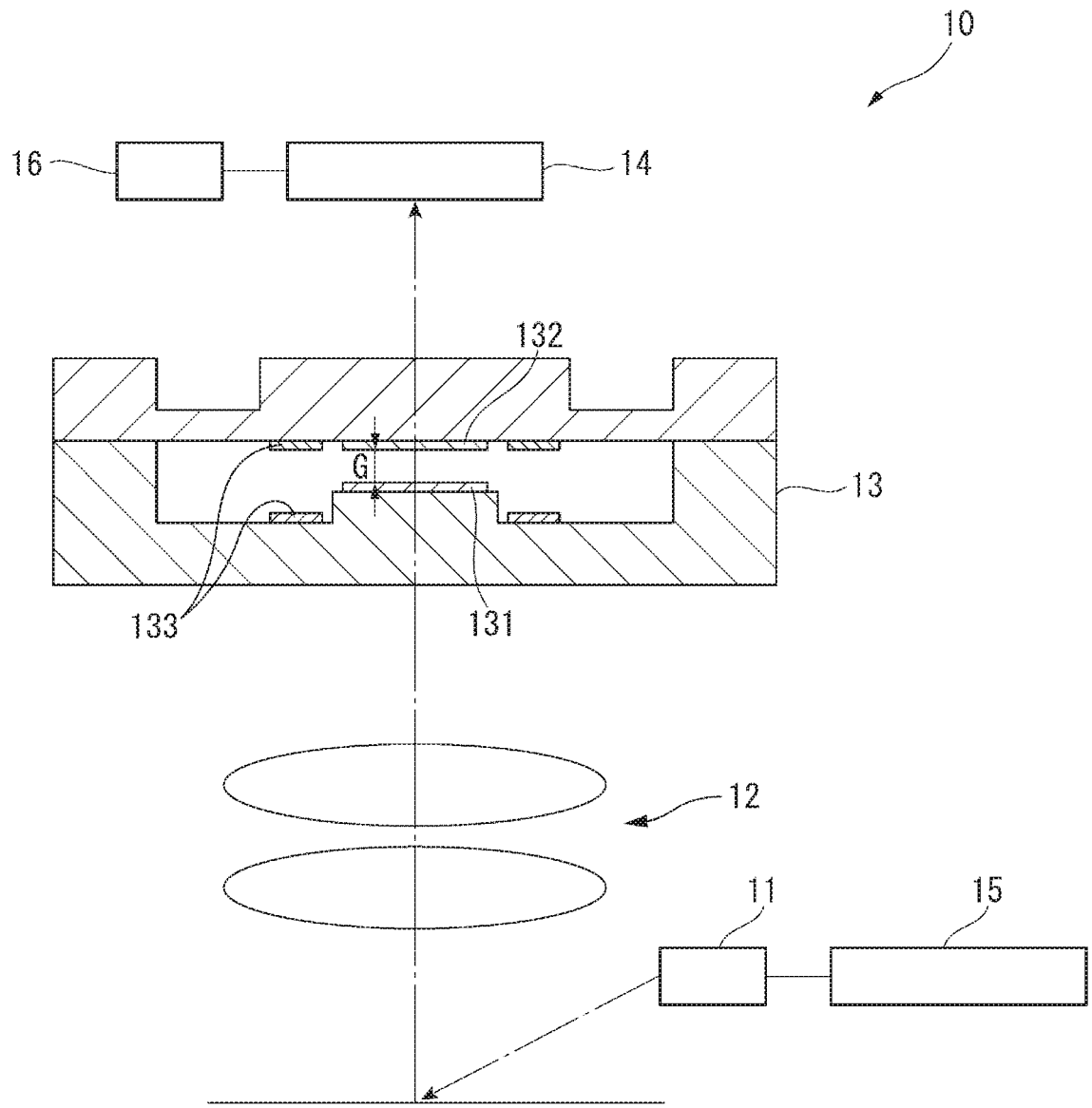
FIG. 2 is a schematic diagram showing a schematic configuration of a spectrometer according to this embodiment.

FIG. 2 is a schematic diagram showing a schematic configuration of the spectrometer 10.

The spectrometer 10 acquires the spectral image I of a predetermined imaging range, and includes an illumination unit 11, an incident optical system 12, an optical filter 13, and an imaging unit 14, as shown in FIG. 2.

The illumination unit 11 includes a plurality of types of light sources, and a type of light source selected under control of the control unit 20 irradiates the imaging range with illumination light.

The incident optical system 12 is configured with, for example, a telecentric optical system or the like, and guides the light reflected by an object disposed in the imaging range to the optical filter 13.

The optical filter 13 is, for example, a wavelength variable interference filter. The optical filter 13 includes a pair of reflection films 131, 132 that face each other with a gap G interposed therebetween, and an electrostatic actuator 133 including electrodes provided on both reflection films. In the optical filter 13, a voltage applied to the electrostatic actuator 133 is controlled, and a dimension of the gap G between the pair of reflection films 131 and 132 varies, so that light having a wavelength corresponding to the dimension is transmitted.

The imaging unit 14 captures the spectral image I according to an intensity of the light transmitted through the optical filter 13, and stores the spectral image I in a storage unit 21 described later. As the imaging unit 14, for example, a CCD or a CMOS may be used.

As shown in FIG. 2, the spectrometer 10 of the present embodiment includes an illumination direction changing mechanism 15 that varies a posture of the illumination unit 11 (illumination direction), and an imaging angle changing mechanism 16 that varies a posture of the imaging unit 14 (imaging angle). These mechanisms are respectively driven under the control of the control unit 20.

The imaging condition by the above spectrometer 10 is determined by one or more condition elements. Examples of the condition elements for determining the imaging condition include a light source type and the illumination direction of the illumination unit 11, an exposure time and the imaging angle of the imaging unit 14, and a magnification of the incident optical system 12.

Configuration of Control Unit 20

The control unit 20 is a device that performs control of the spectrometer 10 and analysis processing, and includes a storage unit 21 and an arithmetic processing unit 22, as shown in FIG. 1.

The storage unit 21 is configured with, for example, a memory, a hard disk drive, and the like. The storage unit 21 stores an operating system (OS), various programs, and various types of data for controlling overall operations of the analysis device 1.

The arithmetic processing unit 22 includes, for example, an arithmetic circuit such as a central processing unit (CPU) and a storage circuit. The arithmetic processing unit 22 functions as a meter control unit 221, an analyzing unit 222, a candidate condition setting unit 223, an imaging environment adjustment unit 224, an evaluation unit 225, and an imaging condition determining unit 226 as illustrated in FIG. 1 by reading and executing the various programs stored in the storage unit 21.

The meter control unit 221 controls each unit of the spectrometer 10 to acquire the spectral image I of an object set in the imaging range of the spectrometer 10.

The analyzing unit 222 analyzes the analysis target based on the spectral image I of the analysis target captured by the spectrometer 10. The type of analysis by the analyzing unit 222 is not particularly limited, and may be, for example, component analysis, foreign object detection, and the like.

The candidate condition setting unit 223, the imaging environment adjustment unit 224, the evaluation unit 225, and the imaging condition determining unit 226 cooperatively perform an imaging condition determining method described later.

Imaging Condition Determining Method

Figure 3:
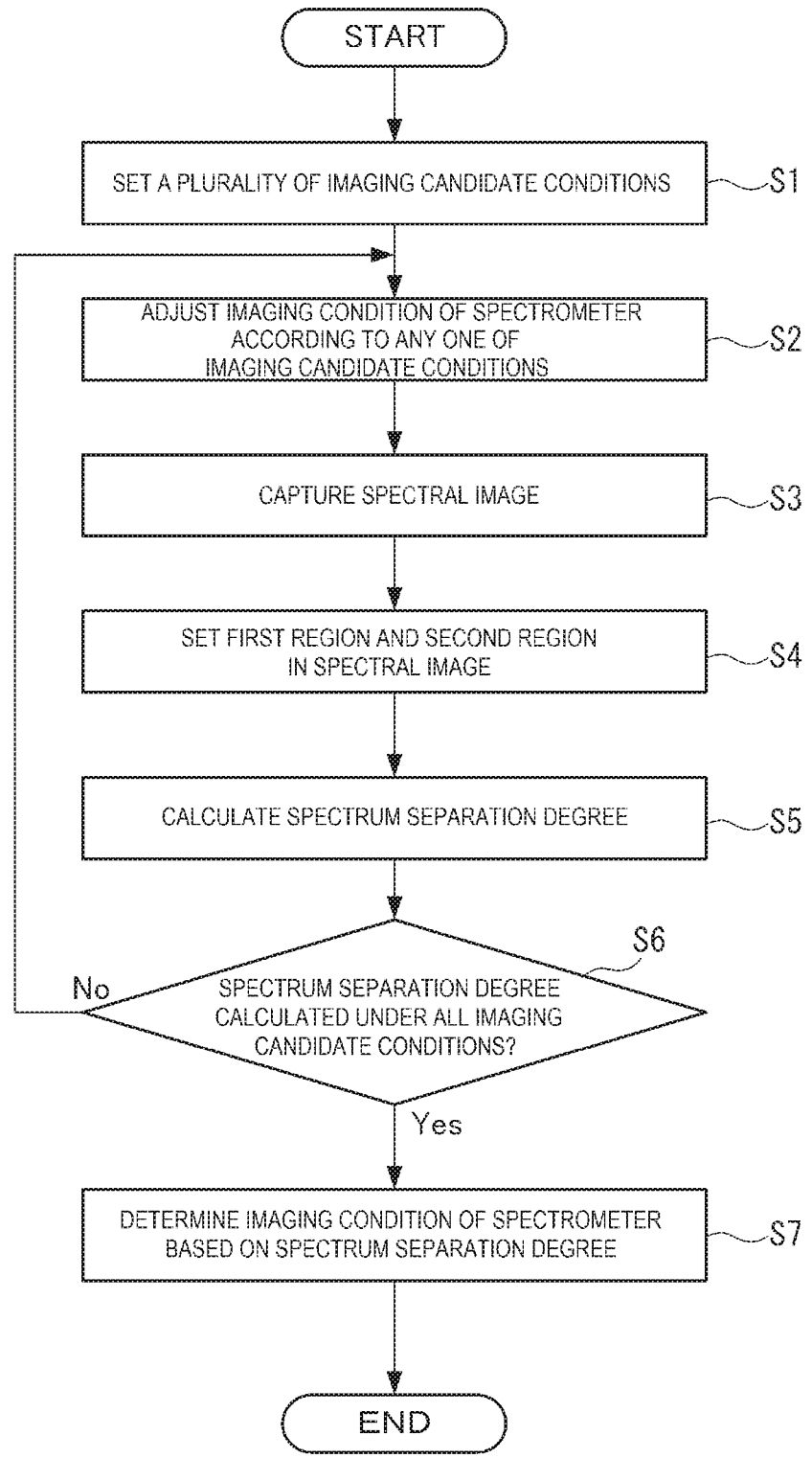
FIG. 3 is a flowchart for showing an analysis method of the present embodiment.

The imaging condition determining method of the present embodiment will be described with reference to a flowchart of FIG. 3. The imaging condition determining method of the present embodiment evaluates candidates of the imaging conditions, selects an optimal candidate based on evaluation values of respective candidates, and includes the imaging condition evaluation method of the present disclosure.

In addition, the imaging condition determining method of the present embodiment determines an imaging condition that can suitably determine each spectral spectrum of two objects (a first object X1 and a second object X2) having different compositions. For example, when analyzing a plurality of foods placed on one plate at the same time, such as food analysis, the imaging condition determining method of the present embodiment can be used to determine an imaging condition that can suitably determine optical spectrum of each food.

Firstly, as preliminary preparation, a user places the first object X1 and the second object X2 having different compositions in the imaging range of the spectrometer 10. When the food analysis described above is assumed, the first object X1 and the second object X2 are different types of foods.

Here, the user may store respective setting positions of the first object X1 and the second object X2 in the imaging range of the spectrometer 10 in the storage unit 21 via the operation unit 30.

In addition, the user inputs information on the candidates of the imaging conditions (imaging candidate conditions) to the analysis device 1 via the operation unit 30 according to the type of the desired analysis. The candidate condition setting unit 223 sets a plurality of imaging candidate conditions based on the input information, and stores the plurality of imaging candidate conditions into the storage unit 21(Step S1).

Then, the imaging environment adjustment unit 224 selects an unmeasured imaging candidate condition among the plurality of imaging candidate conditions stored in the storage unit 21, and controls each unit of the spectrometer 10 based on the imaging candidate condition. Thus, the imaging environment adjustment unit 224 adjusts imaging environment by the spectrometer 10 according to the imaging candidate conditions (Step S2).

For example, when the imaging candidate conditions are a combination of the illumination direction and the imaging angle, the imaging environment adjustment unit 224 controls the illumination direction changing mechanism 15 and the imaging angle changing mechanism 16 based on the imaging candidate conditions. The imaging candidate conditions are not limited thereto, and may be a combination including the light source type of the illumination unit 11, the exposure time of the imaging unit 14, and the like.

Then, the meter control unit 221 controls the spectrometer 10 to capture the spectral image I including the first object X1 and the second object X2 (step S3; spectral image capturing step). Specifically, while the illumination unit 11 irradiates the first object X1 and the second object X2 with illumination light, the optical filter 13 transmits light having a wavelength corresponding to the voltage applied to the electrostatic actuator 133 among the lights reflected respectively by the first object X1 and the second object X2. Here, since the voltage applied to the electrostatic actuator 133 is sequentially varied, the wavelength of the light transmitted through the optical filter 13 is sequentially varied. The imaging unit 14 captures the spectral image I by lights of respective wavelengths transmitted through the optical filter 13, and stores the spectral image I in the storage unit 21.

Figure 4:
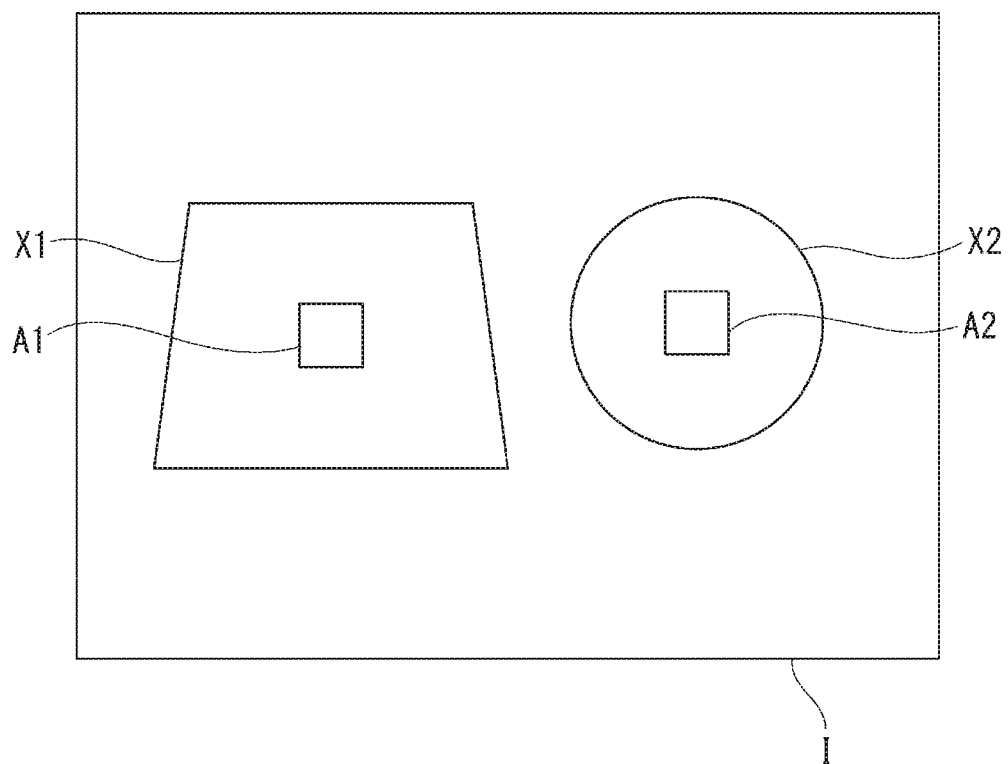
FIG. 4 is a schematic diagram showing an example of a spectral image in the present embodiment.

FIG. 4 is a schematic diagram showing an example of the spectral image I in the present embodiment.

The evaluation unit 225 acquires the spectral image I captured in step S3 from the spectrometer 10, and sets a first region A1 and a second region A2 different from each other in the spectral image I, as shown in FIG. 4 (step S4; region setting step).

Specifically, the evaluation unit 225 sets the first region A1 in an arrangement range of the first object X1 in the spectral image I, and sets the second region A2 in an arrangement range of the second object X2 in the spectral image I. In this setting method, for example, the position information of the first object X1 and the second object X2 stored in the storage unit 21 in advance may be used, or image recognition technology may be used. Sizes (numbers of pixels) of the first region A1 and the second region A2 can be set arbitrarily.

Then, the evaluation unit 225 calculates an evaluation value of the imaging condition based on an optical spectrum of the first region A1 and an optical spectrum of the second region A2 (step S5; evaluation step).

In the present embodiment, a spectrum separation degree is used as the evaluation value of the imaging condition. The spectrum separation degree indicates a degree of a separation between the optical spectrum of the first region A1 and the optical spectrum of the second region A2 in the spectral image I. The spectrum separation degree can be calculated by calculating the separation degree between the first region A1 and the second region A2 for each wavelength of the spectral image I and adding the separation degree calculated for each wavelength.

Specifically, a spectrum separation degree S can be calculated by the following equation (1).

$$S = \frac{\omega_1 \sum_\lambda (m_{\lambda 1} - m_{\lambda t})^2 + \omega_2 \sum_\lambda (m_{\lambda 2} - m_{\lambda t})^2}{\omega_1 \sum_\lambda \sigma_{\lambda 1}^2 + \omega_2 \sum_\lambda \sigma_{\lambda 2}^2} \quad (1)$$

Here, the number of pixels in the first region A1 is $\omega_1$, and the number of pixels in the second region A2 is $\omega_2$. In addition, for the first region A1, an average of the spectrum at a wavelength $\lambda$ is defined as $m_{\lambda 1}$, and a dispersion of the spectrum at the wavelength $\lambda$ is defined as $\sigma_{\lambda 1}^2$. Similarly, for the second region A2, an average of the spectrum at the wavelength $\lambda$ is $m_{\lambda 2}$, and a dispersion of the spectrum at the wavelength $\lambda$ is defined as $\sigma_{\lambda 2}^2$. In addition, for the total region (A1+A2) obtained by combining the first region A1 and the second region A2, an average of the spectrum at the wavelength $\lambda$ is $m_{\lambda t}$, and a dispersion thereof is defined as $\sigma_{\lambda t}^2$. The wavelength $\lambda$ is set at a predetermined interval in an arbitrary wavelength range, for example.

In addition, the spectrum separation degree S can also be calculated by the following equation (2).

$$S = \frac{\omega_1 \sum_\lambda (m_{\lambda 1} - m_{\lambda t})^2 + \omega_2 \sum_\lambda (m_{\lambda 2} - m_{\lambda t})^2}{\omega_1 \sum_\lambda \sigma_{\lambda 1}^2 + \omega_2 \sum_\lambda \sigma_{\lambda 2}^2} \times \frac{f_W}{f_B} \quad (2)$$

The equation (2) is a calculation method in consideration of freedom of data. That is, in the equation (2), an inter-region freedom is defined as $f_B$, and an intra-region freedom is defined as $f_W$. The inter-region freedom $f_B$ is obtained by subtracting 1 from the number of regions set in the spectral image I, and the intra-region freedom $f_W$ is obtained by subtracting the number of regions from the total number of pixels in the total region. In the present embodiment, the number of regions set in the spectral image I is two.

The method for calculating the spectrum separation degree S is not limited to the example described above, and any equation can be used.

The evaluation unit 225 stores the spectrum separation degree S calculated above in the storage unit 21 in association with the imaging candidate condition.

Then, the imaging condition determining unit 226 determines whether or not spectrum separation degrees S are calculated under all imaging candidate conditions with respect to the plurality of imaging candidate conditions stored in the storage unit 21 (Step S6).

When it is determined as No in step S6, the process returns to step S2, and the imaging environment adjustment unit 224 adjusts the imaging condition of the spectrometer 10 based on the imaging candidate conditions whose spectrum separation degree S has not been calculated.

On the other hand, when it is determined as Yes in step S6, the imaging condition determining unit 226 selects an imaging candidate condition corresponding to the highest spectrum separation degree S among all the imaging candidate conditions stored in the storage unit 21, and determines the selected imaging candidate condition as the imaging condition of the main analysis (Step S7).

Thus, the flow of the imaging condition determining method ends. The optical spectrum of the first object X1 and the optical spectrum of the second object X2 can be suitably determined by using the imaging condition thus determined as the imaging condition of the main analysis. As a result, the analysis accuracy of the entire analysis target including the first object X1 and the second object X2 is improved.

Effects of the Present Embodiment

The analysis device 1 of the present embodiment includes the spectrometer 10 that captures the spectral image I in an arbitrary set imaging condition, and the evaluation unit 225 that sets the first region A1 and the second region A2 different from each other in the spectral image I, and that calculates the evaluation value of the imaging condition based on the optical spectrum of the first region A1 and the optical spectrum of the second region A2.

According to this embodiment, it is not necessary to analyze a known sample in the same manner as the main analysis, and the appropriateness of the imaging condition can be easily evaluated. Therefore, it is possible to shorten a time required for searching for an optimal imaging condition from a plurality of imaging conditions.

In the present embodiment, the evaluation unit 225 calculates the spectrum separation degree S representing the degree of the separation between the optical spectrum of the first region A1 and the optical spectrum of the second region A2 as the evaluation value of the imaging condition. Particularly, in the present embodiment, the evaluation unit 225 sets the first region A1 within the arrangement range of the first object X1 in the spectral image I, and sets the second region A2 within the arrangement range of the second object X2 in the spectral image I.

According to this embodiment, the spectrum separation degree S indicates the degree of the separation between the optical spectrum of the first object X1 and the optical spectrum of the second object X2. When the spectrum separation degree S is low, the influence of an external light component and a regular reflection component of the illumination light with respect to the spectral image I is strong, and it is considered that the difference between the optical spectrum of the first object X1 and the optical spectrum of the second object X2 is difficult to distinguish. On the other hand, when the spectrum separation degree S is high, the influence of the external light component or the regular reflection component of the illumination light with respect to the spectral image I is small, and it is considered that a clear difference appears between the optical spectrum of the first object X1 and the optical spectrum of the second object X2. Therefore, an imaging condition with a higher spectrum separation degree S can be evaluated as a more appropriate imaging condition.

Therefore, in the present embodiment, by using the spectrum separation degree S, it is possible to more suitably evaluate the appropriateness of the imaging condition.

In the present embodiment, the spectrometer 10 includes the illumination unit 11 that emits illumination light to the first object X1 and the second object X2, and the illumination direction changing mechanism 15 that varies the posture of the illumination unit 11.

In the present embodiment, the spectrometer 10 includes the imaging unit 14 that captures the spectral image I, and the changing mechanism that varies the posture of the imaging unit 14.

According to this embodiment, it is possible to suitably search for an imaging condition in which the influence of the external light component or the regular reflection component of the illumination light with respect to the spectral image I is small.

Modification

The present disclosure is not limited to the above embodiment, modifications and improvements as long as the object of the present disclosure can be achieved are also included in the present disclosure.

The above embodiment is searching for an imaging condition in which the optical spectrums of two objects having different compositions can be suitably determined, but the present disclosure is not limited to this. That is, the imaging condition evaluation method of the present disclosure can search for an imaging condition in which the same optical spectrum for the same object is stably acquired, regardless of the region in the imaging range.

Here, FIG. 5 is a schematic diagram showing an example of the spectral image I in the modification. The spectral image I may be acquired by capturing an image of at least one object X.

In this modification, as shown in FIG. 5, the evaluation unit 225 sets the first region A1 and the second region A2 within an arrangement range of the same object X in the spectral image I. In addition, the imaging condition determining unit 226 may determine an imaging candidate condition in which a lowest spectrum separation degree S is calculated among the plurality of imaging candidate conditions as the imaging condition of the main analysis.

By using the imaging condition determined by such a method for the main analysis, it is possible to stably acquire the same optical spectrum for the same object regardless of the region in the imaging range. This improves the accuracy of type determination, foreign object detection, and the like of the analysis target.

In the above embodiment, two regions, i.e. the first region A1 and the second region A2 are set in the spectral image I, but more regions may be set in the spectral image I. For example, in the spectral image I, a third region different from the first region A1 and the second region A2 may be set in addition to the first region A1 and the second region A2. In this case, the spectrum separation degree between the first region A1 and the second region A2, the spectrum separation degree between the second region A2 and the third region, and the spectrum separation degree between the first region A1 and the third region may be calculated. By using these three spectrum separation degrees as the evaluation values of the imaging condition, the appropriateness of the imaging conditions can be evaluated more accurately.

In the above embodiment, the spectrum separation degree S is used as the evaluation value of the imaging condition, but the present disclosure is not limited thereto, and any index for evaluating the correlation between the optical spectrum of the first region A1 and the optical spectrum of the second region A2 in the spectral image I may be used as the evaluation value.

In the above embodiment, the imaging condition evaluation device of the present disclosure is configured as the analysis device 1, but the present disclosure is not limited thereto. For example, the imaging condition evaluation device of the present disclosure may be configured as a device that does not have an analysis function and may be incorporated in an electronic device having other functions.

What is claimed is:

1. An imaging condition evaluation device, comprising:
   a spectrometer configured to capture a spectral image under an arbitrarily set imaging condition; and
   an evaluation unit configured to set a first region and a second region different from each other in the spectral image, and calculate an evaluation value of the imaging condition based on an optical spectrum of the first region and an optical spectrum of the second region.

2. The imaging condition evaluation device according to claim 1, wherein
   the evaluation unit is configured to calculate a spectrum separation degree representing a degree of a separation between the optical spectrum of the first region and the optical spectrum of the second region as the evaluation value.

3. The imaging condition evaluation device according to claim 1, wherein
   the evaluation unit is configured to set the first region within a first object in the spectral image, and set the second region within a second object in the spectral image, the second object being different from the first object.

4. The imaging condition evaluation device according to claim 1, wherein
   the evaluation unit is configured to set the first region and the second region within the same object in the spectral image.

5. The imaging condition evaluation device according to claim 1, wherein
   the spectrometer includes an illumination unit configured to emit illumination light, and an illumination direction changing mechanism configured to vary a posture of the illumination unit, and the imaging condition is adjusted by the illumination direction changing mechanism changing the posture of the illumination unit.

6. The imaging condition evaluation device according to claim 1, wherein the spectrometer includes an imaging unit configured to capture the spectral image, and a changing mechanism configured to vary a posture of the imaging unit, and the imaging condition is adjusted by the posture of the imaging unit.

7. An imaging condition evaluation method, comprising:

a spectral image capturing step of capturing a spectral image under an arbitrarily set imaging condition;

a region setting step of setting a first region and a second region different from each other in the spectral image; and an evaluation step of calculating an evaluation value of the imaging condition based on an optical spectrum of the first region and an optical spectrum of the second region.

* * * * *